United States Patent
Frivik et al.

(10) Patent No.: US 8,625,387 B2
(45) Date of Patent: Jan. 7, 2014

(54) METHODS OF RANGE SELECTION FOR POSITIONING MARINE SEISMIC EQUIPMENT

(75) Inventors: Svein Arne Frivik, Oslo (NO); Leendert Combee, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 897 days.

(21) Appl. No.: 12/498,339

(22) Filed: Jul. 6, 2009

(65) Prior Publication Data

US 2009/0268552 A1 Oct. 29, 2009

Related U.S. Application Data

(62) Division of application No. 11/385,159, filed on Mar. 21, 2006, now abandoned.

(51) Int. Cl.
*G01V 1/38* (2006.01)

(52) U.S. Cl.
CPC ............. *G01V 1/38* (2013.01); *G01V 1/3835* (2013.01)
USPC ............................................. 367/19; 367/21

(58) Field of Classification Search
USPC .......................................................... 367/19
See application file for complete search history.

(56) References Cited

U.S. PATENT DOCUMENTS

| | | | |
|---|---|---|---|
| 4,376,301 A * | 3/1983 | Roberts | 367/19 |
| 5,128,904 A * | 7/1992 | Chambers | 367/129 |
| 5,359,575 A * | 10/1994 | Williams et al. | 367/127 |
| 6,411,902 B1 * | 6/2002 | Wiltshire | 702/7 |
| 7,457,195 B2 * | 11/2008 | Jones | 367/38 |

\* cited by examiner

Primary Examiner — Krystine Breier

(57) ABSTRACT

A method for selecting a signal arrival for determining an accurate position of seismic equipment includes the steps of transmitting a signal from a pinger; predicting a direct arrival and a reflected arrival of the signal at a receiver, wherein each arrival is the time between the transmission of the signal to reception of the signal; measuring arrivals of the signal at the receiver; selecting the measured signal arrival that is similar to the predicted direct arrival as a preliminary signal arrival; defining a confidence interval for the actual direct arrival of the signal based on the predicted direct arrival and the predicted reflected arrival; and finalizing the signal arrival, wherein the selected preliminary signal arrival is the finalized signal arrival if it is within the confidence interval.

7 Claims, 1 Drawing Sheet

US 8,625,387 B2

METHODS OF RANGE SELECTION FOR POSITIONING MARINE SEISMIC EQUIPMENT

RELATED APPLICATION

This application is a divisional application of U.S. patent application Ser. No. 11/385,159, filed on Mar. 21, 2006 now abandoned.

TECHNICAL FIELD

The present invention relates in general to methods for determining the position of seismic spreads and more particularly to a model based range selection method for determining the geometric configuration and position of seismic equipment in a seismic spread.

BACKGROUND

In underwater acoustic navigation of a marine seismic spread, ranges are measured to determine the geometric relationship between the seismic equipment and a position of the seismic equipment and the spread. An accurate range is the travel time of the direct arrival of a signal from a pinger by a particular receiver. The direct arrival is the acoustic signal traveling along the path of shortest travel time in the water column without being influenced by the reflection from a boundary. Reflections from a boundary, the sea-surface or sea floor, travel a longer distance than the direct arrival signals and are therefore subject to a time delay relative to the direct arrival. Tracking the reflections rather than the direct arrival signals may deteriorate the acoustic ranges and may cause the acoustic network solution to deteriorate, resulting in a deteriorated positioning of the seismic equipment.

Historically, the ranges with time delays due to reflections are filtered to avoid their introduction in the positioning solution. The traditional methods for "editing" the ranges have been manual, i.e. by adjusting the range by subtracting the effect of the reflection or by setting a range to passive. These prior art methods for editing are manageable for positioning systems that rely on only a few hundred ranges. However, these prior art methods fail when the number of ranges increase. For example, WesternGeco's intrinsic range modulated acoustic ranging system may include more than 10,000 ranges.

Therefore, it is a desire to provide a method of selecting the direct range for accurately positioning marine seismic equipment that addresses drawbacks of the prior art methods. It is a further desire to provide a method of range selection that utilizes information about the seismic spread as well as environmental parameters to predict direct arrival and reflected arrival of a signal by a receiver. It is a still further desire to provide a method for rejecting reflected signals that are received. It is a still further desire to condition a range based on a received reflected signal.

SUMMARY

Accordingly, methods for selecting an accurate signal arrival by a receiver from a pinger for accurately positioning seismic equipment are provided. The methods are particularly adapted for ranging systems such as disclosed in U.S. Pat. No. 5,668,775, which is incorporated herein by reference.

An embodiment of a method for selecting a signal arrival for determining an accurate position of seismic equipment includes the steps of transmitting a signal from a pinger; measuring arrivals of the signal at a receiver, wherein each arrival is the time between the transmission of the signal to reception of the signal; selecting one of the signal arrivals as a preliminary signal arrival; calculating a confidence interval for an estimated direct arrival of the signal; and selecting a final signal arrival, wherein the selected preliminary signal arrival is the selected final signal arrival if it is within the confidence interval.

Another embodiment of a method for selecting a signal arrival for determining an accurate position of seismic equipment includes the steps of transmitting a signal from a pinger; predicting a direct arrival and a reflected arrival of the signal at a receiver, wherein each arrival is the time between the transmission of the signal to reception of the signal; measuring arrivals of the signal at the receiver; selecting the measured signal arrival that is similar to the predicted direct arrival as a preliminary signal arrival; and finalizing the selected signal arrival, wherein the selected preliminary signal arrival is the finalized signal arrival if it correlates with the predicted direct arrival.

A further embodiment of a method for selecting a signal arrival for determining an accurate position of seismic equipment includes the steps of transmitting a signal from a pinger; predicting a direct arrival and a reflected arrival of the signal at a receiver, wherein each arrival is the time between the transmission of the signal to reception of the signal; measuring arrivals of the signal at the receiver; selecting the measured signal arrival that is similar to the predicted direct arrival as a preliminary signal arrival; defining a confidence interval for the actual direct arrival of the signal based on the predicted direct arrival and the predicted reflected arrival; and finalizing the signal arrival for calculating the receiver position, wherein the selected preliminary signal arrival is the finalized signal arrival if it is within the confidence interval.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION

Figure 1:
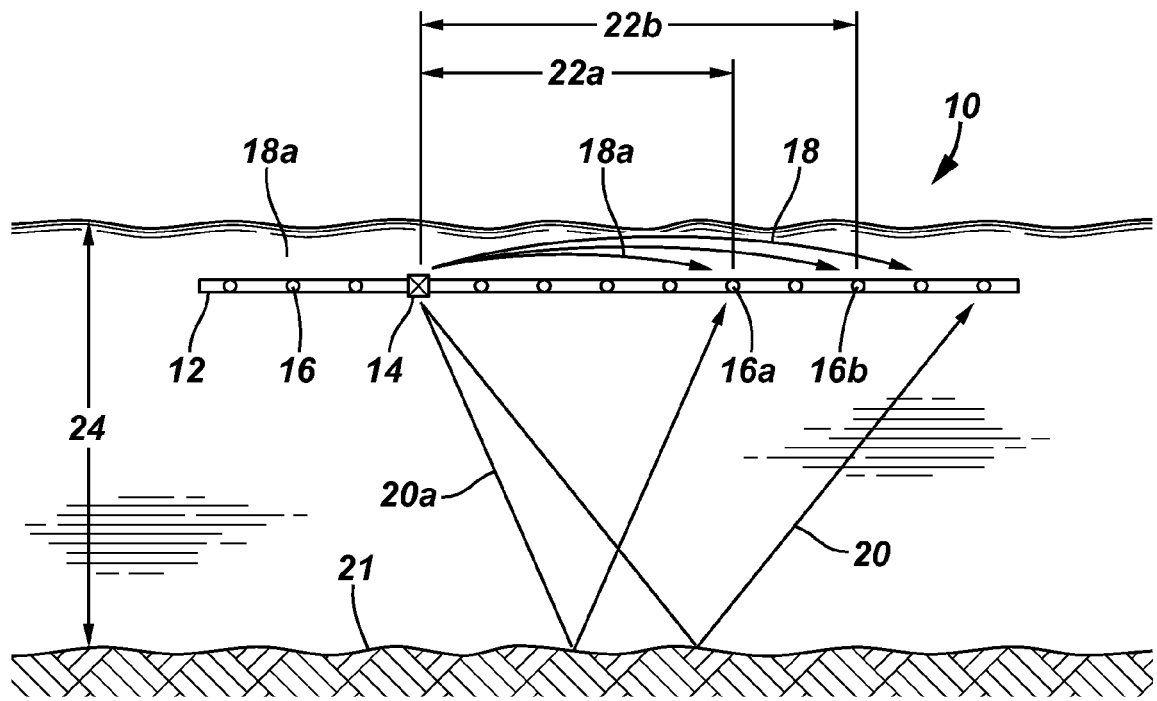
FIG. 1 is a schematic of an embodiment of a spread seismic equipment of a ranging system of the present invention illustrating the propagation paths of an acoustic event.

Refer now to the drawings wherein depicted elements are not necessarily shown to scale and wherein like or similar elements are designated by the same reference numeral through the several views.

FIG. 1 is an illustration of an embodiment of a spread of seismic equipment of a seismic positioning system of the present invention, generally designated by the numeral 10, illustrated as a shallow water geometry in 2D. Seismic spread 10 includes at least one streamer 12 having at least one pinger 14 and a plurality of receivers 16. As is well known in the art, a seismic spread commonly includes multiple streamers 12 each of which includes a plurality of pingers 14 and receivers 16. The geographic location of at least one point in the spread is typically known from convention means, such as a global positioning system. For example, the geographic location of pinger 14 may be determined by a global positioning system.

An acoustic transmitter 14, also referred to as a pinger, produces an acoustic event that is recorded by the plurality of receivers 16. Each receiver 16 receives an acoustic signal from pinger 14 at two different times, a direct wave 18 arrival and a reflected wave 20 arrival.

As shown in relation to receiver 16a, pinger 14 creates an acoustic event. The direct wave 18a is the acoustic event traveling the shortest distance in the water column without being influenced by a boundary 21 and provides the desired direct or accurate range 22a for positioning the seismic equipment. In the illustration of FIG. 1, boundary 21 is the seafloor but may be the water surface. Reflection 20a travels a longer distance than direct wave 18a and therefore its arrival at receiver 16a is time delayed. An accurate range 22a for receiver or hydrophone 16a is determined by the travel time of direct wave 18a. Thus, it is necessary to detect and track the arrival of direct wave 18a and not the arrival time of reflections 20a to determine range 22a.

An accurate image of the spread of the seismic equipment and its geographic position is necessary for a proper acoustic network. In a ranging positioning system 10 independent of water depth 24, it is desired to range as long as possible to ensure that all ranges 22 (short and long) make a proper acoustic network.

Tracking reflection 20 arrivals, rather than direct wave 18 arrivals, may deteriorate acoustic ranges 22 due to the time delay of the arrival of reflection 20 at a particular receiver 16. This deterioration or break down in the positioning estimates for the seismic equipment is most common in shallow water environments, but also occurs in deeper waters when the seismic spread is towed deep. In shallow water, typically less than 30 to 40 meters, the ratio of range 22 length to water depth 24 becomes high (much greater than 10). Thus, the time delay between the arrival of direct wave 18 and reflection wave 20 becomes smaller as a function of offsets, and accurate selection of ranges 22 becomes more difficult.

Figure 2:
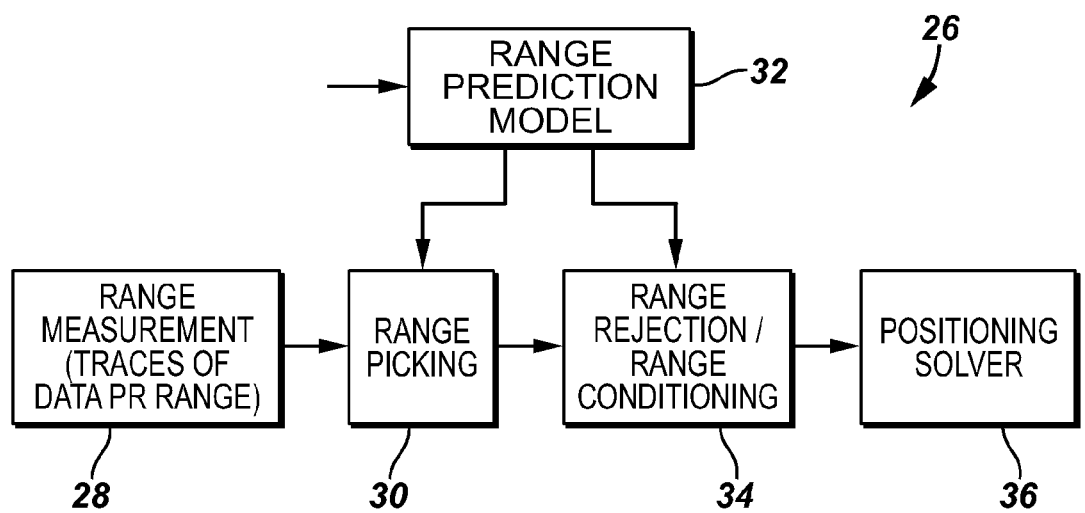
FIG. 2 is a block diagram illustrating an embodiment of a method of range selection for accurately positioning marine seismic equipment.

FIG. 2 is a diagram of an embodiment of a method of positioning seismic equipment, generally denoted by the numeral 26. Method 26 is described with reference to FIG. 1, and more particularly in relation to receiver 16a and pinger 14 for purposes of simplicity. Method 26 includes: step 28—measuring ranges; step 30—selecting an initial range; step 32—predicting a direct range; step 34—finalizing range selection; and step 36—determining the position of the seismic equipment.

Range prediction step 32 includes estimating the arrival time of direct wave 18a and reflection 20a at receiver 16a, and the difference between the arrival times, thereby predicting the direct range. The predicted direct ranges for each receiver is calculated using the sound speed profile, pinger-receiver geometry, water depth, streamer depth, and may include other parameters that may influence the time delay of the arrival of the reflection. Direct range prediction model 32 may be a complex propagation model, ray tracing model or a more simplistic geometrical consideration with velocity information. The direct predicted range from step 32 may be utilized in the step of selecting an initial range 30 and/or the step of finalizing a range selection 34.

In step 28 an acoustic event is created by pinger 14 propagating direct wave 18a and reflected wave 20, the arrival of each is measured or recorded at receiver 16a. Thus, at step 28 the arrival measurements provide at least two possible ranges, a direct range and a reflected range. In preliminary range selection step 30, the measured arrivals are compared so that the preliminary direct range may be selected. Results from range prediction model 32 may be utilized to select this preliminary direct range selection, i.e. arrival of direct wave 18a. The preliminary direct range selection may be fed into seismic equipment position determination step 36.

In the embodiment illustrated in FIG. 2, finalizing the range selection step 34 is conducted before determining the seismic equipment position 36. Step 34 includes creating a confidence interval in which arrival of direct wave 18 is likely to occur at a receiver 16. The confidence interval may be calculated in direct range prediction step 32 or may be determined using separate criteria as an additional check point for selecting the direct range. The preliminary direct range selected in step 30 for a receiver may be compared to the calculated confidence interval. If the preliminary direct range selected correlates with the confidence interval, the preliminary direct range is finalized and passed to positioning step 36. If the preliminary direct range selected does not correlate with the confidence interval, the preliminary range is deemed bad. If the preliminary direct range is bad it may be rejected in finalizing step 34 and not passed to equipment positioning step 36. Alternatively, if the preliminary direct range is bad the preliminary direct range may be conditioned and the conditioned range passed to equipment positioning step 36. The conditioned range may be an estimated arrival of direct wave 18. Desirably, in equipment positioning step 36 a conditioned range is given less weight than a measured direct wave arrival.

From the foregoing detailed description of specific embodiments of the invention, it should be apparent that a method and system for solving the position of seismic equipment that is novel has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A method for selecting a signal arrival for determining an accurate position of seismic equipment, comprising:
predicting a direct arrival and a reflected arrival of a signal transmitted from a pinger to a receiver, wherein each arrival is the time between the transmission of the signal to reception of the signal;
defining a confidence time interval for reception of the direct signal arrival based on the predicted direct signal arrival;
transmitting the signal from the pinger;
measuring the direct and the reflected arrivals of the signal at the receiver;
selecting the measured signal arrival that is similar to the predicted direct arrival as a preliminary signal arrival; and
finalizing a signal arrival for determining the position of seismic equipment, wherein the selected preliminary signal arrival is the finalized signal arrival if the selected preliminary signal arrival was measured within the confidence time interval, and wherein the finalizing the selected arrival comprises adjusting the selected preliminary signal arrival to substantially match the predicted direct signal arrival when the selected preliminary signal arrival was measured outside of the confidence time interval.

2. The method of claim 1, further comprising determining the position of the receiver relative to the pinger based on the finalized signal arrival.

3. The method of claim 1, wherein the pinger and the receiver are provided in a marine environment.

4. The method of claim 1, further comprising determining the position of the receiver relative to the pinger based on the finalized signal arrival.

5. The method of claim 4, wherein the pinger and the receiver are provided in a marine environment.

6. A method for selecting a signal arrival for determining an accurate position of seismic equipment, comprising:

estimating a direct arrival of a signal, wherein an arrival is the time between transmission from pinger to reception at a receiver;

calculating a confidence time interval for reception of the direct arrival based on the estimated direct signal arrival;

transmitting the signal from the pinger;

measuring arrivals of the signal at the receiver;

selecting one of the measured signal arrivals as a preliminary signal arrival;

selecting a final signal arrival from the measured signal arrivals, wherein selecting the final signal arrival comprises one selected from the group of selecting the selected preliminary signal arrival as the selected final signal arrival if the selected preliminary signal arrival was measured within the confidence time interval and conditioning the selected preliminary signal arrival to substantially equal the estimated direct signal arrival at the receiver when the selected preliminary arrival was measured outside of the confidence time interval; and determining the position of the receiver relative to the pinger based on the finalized signal arrival.

7. The method of claim 6, wherein calculating the direct signal arrival comprises utilizing the pinger-receiver geometry and a sound speed profile of the medium in which the pinger and receiver are provided.

\* \* \* \* \*